United States Patent
Marchal

(10) Patent No.: US 6,568,431 B2
(45) Date of Patent: May 27, 2003

(54) DOUBLE-SHELL PIPELINE EXHIBITING IMPROVED BUCKLING STRENGTH

(75) Inventor: Philippe Marchal, Louveciennes (FR)

(73) Assignee: ITP (FR)

( * ) Notice: Subject to any disclaimer, the term of this patent is extended or adjusted under 35 U.S.C. 154(b) by 0 days.

(21) Appl. No.: 09/852,287

(22) Filed: May 10, 2001

(65) Prior Publication Data

US 2002/0079010 A1 Jun. 27, 2002

(30) Foreign Application Priority Data

May 10, 2000 (FR) .............................. 00 05968
Nov. 29, 2000 (FR) .............................. 00 15386

(51) Int. Cl.[7] .................................................. F16L 9/18
(52) U.S. Cl. ........................ 138/112; 138/114; 138/110; 138/148; 138/149
(58) Field of Search ................................. 138/121, 110, 138/114, 148, 149, 172, 112, 113

(56) References Cited

U.S. PATENT DOCUMENTS

| | | | | | |
|---|---|---|---|---|---|
| 3,113,595 A | * | 12/1963 | Cotman, Jr. | ................. | 138/113 |
| 3,126,918 A | * | 3/1964 | Eaton | .......................... | 138/113 |
| 3,379,221 A | * | 4/1968 | Harry et al. | ................. | 138/148 |
| 3,789,129 A | * | 1/1974 | Ditscheid | ..................... | 138/113 |
| 4,037,626 A | * | 7/1977 | Roberts, Jr. | ................. | 138/109 |
| 4,531,552 A | * | 7/1985 | Kim | ............................ | 138/113 |
| 4,615,359 A | * | 10/1986 | Affa et al. | ................... | 138/104 |
| 5,727,599 A | * | 3/1998 | Fisher et al. | ................. | 138/110 |

\* cited by examiner

Primary Examiner—Patrick Brinson
(74) Attorney, Agent, or Firm—Parkhurst & Wendel, L.L.P.

(57) ABSTRACT

A pipeline for moving effluents at seabed level, including an inner shell and at least one outer shell having an outer surface separated from the inner shell by an annular space for receiving an insulating layer, wherein the outer shell includes a set of mutually spaced flutings arrayed along at least a portion of the outer surface and each fluting has a bottom resting on a spacer element located around the inner shell.

12 Claims, 4 Drawing Sheets

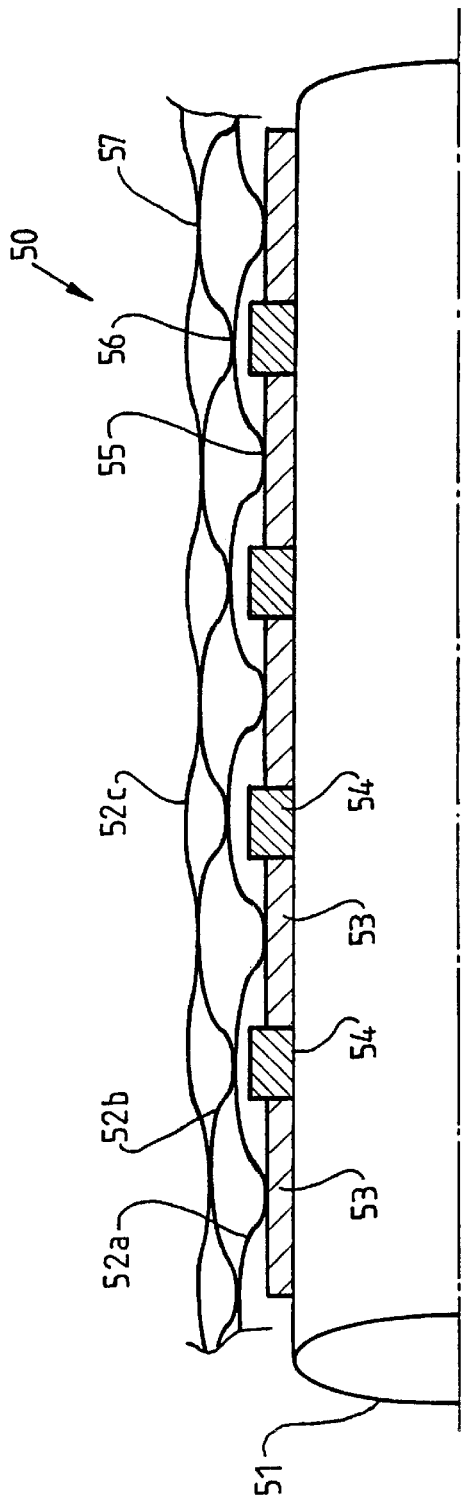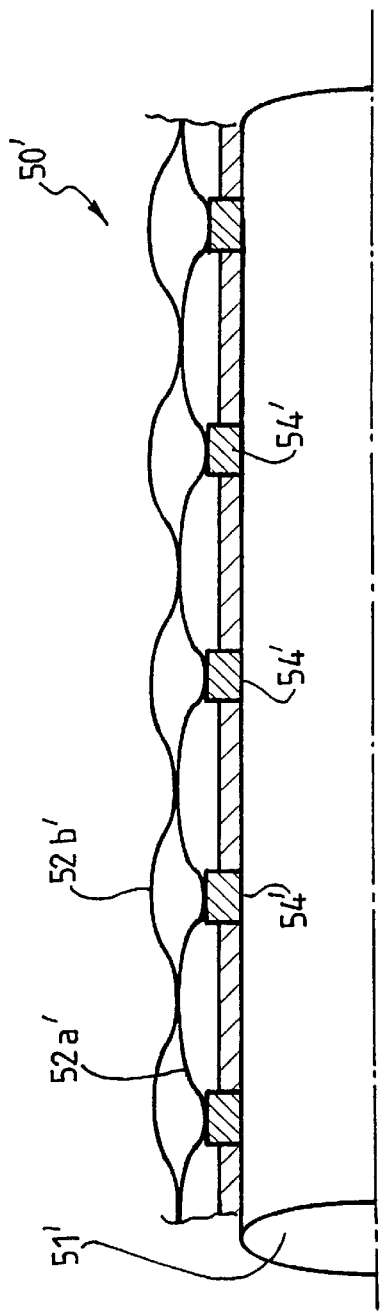

DOUBLE-SHELL PIPELINE EXHIBITING IMPROVED BUCKLING STRENGTH

TECHNICAL FIELD

The technical field of the present invention relates to conduits or pipelines submerged at seabed level and moving effluents.

It is well known to use single-shell or multiple-shell pipelines to move effluents at seabed level.

BACKGROUND ART

Most double-shell pipelines are fitted with an insulator between the two shells in order to reduce thermal losses. One illustrative design is disclosed in the French patent document 2,746,891 A previously filed by applicant. The pipeline described therein offers excellent insulation. However this pipeline still is heavy because comprising two steel shells in its preferred embodiment mode. Such a feature is a drawback in conveyance and especially when installing, the weight supported by the ship at sea possibly becoming prohibitive for the equipment, for instance tightening equipment, mounted on said ship. In the case of deep installations, the weight problem also may be limiting as regards single shell pipelines.

Whatever the pipeline design, it is known that for an ideal round tube or shell, the hydro-static crushing pressure always is much larger than the actually observed buckling pressure. This drop is due to manufacturing imperfections such as the tube being rendered oval or exhibiting flattened parts, thickness variations etc.

There is a present need for lower-weight pipelines without thereby incurring a loss in mechanical strength and without degrading their buckling behavior under hydrostatic pressure.

It is also obvious that making the tube walls thinner may offer significant, direct or indirect cost savings.

The present state of the art suggests using bracing means ("buckling arrestors") when the tube wall thicknesses are less than mandated by the codes. In general such bracing means are apposed parts which must be welded onto the main tube, and they cannot be economically used to preclude buckling: their purpose is to prevent buckling from spreading after it was initiated by an unexpectedly large oval deformation (for instance excessive oval warping during tube laying).

Accordingly the objective of the present invention is to create a novel pipeline fitted with a double or multiple shell and offering a much lower weight at the same crushing strength, or vice-versa offering a substantially increased buckling strength for the same overall shell thickness.

The objective of the invention is a pipeline moving effluents at seabed level and comprising an inner shell and at least one outer shell which is separated from the inner one by an annular space into which is fitted a layer of insulating material, said pipeline being characterized in that the outer shell comprises flutings which are mutually apart and which are arrayed over at least part of its surface, the fluting bases resting against a spacer element mounted around the inner shell.

SUMMARY OF THE INVENTION

In a first embodiment the flutings are configured over the full length of the outer shell.

In another pipeline embodiment, the fluting depth is between 1 and 10% of the outside diameter of the outer shell.

In another feature of the pipeline of the invention, the fluting width at its inside base is substantially between 1 mm and 30% of the outside diameter of the outer shell.

In another feature of the pipeline of the invention, the flutings are configured concentrically with the longitudinal axis XX of said pipeline.

In yet another feature of the invention, the flutings when seen cross-sectionally are in the form of a circle.

In one embodiment variation of the invention, the flutings are mutually apart by a distance d substantially between 0.25 and 3 times the outside diameter of the outer shell.

In another feature of the invention, the flutings run helically at a pitch substantially between 0.25 and 3 times the outside diameter of the outer shell.

In another embodiment variation of the invention, the spacer element may be made of an insulating material, illustratively an open-pore micro-pore material.

The pipeline may comprise a metal lamella forced against the insulator, the flutings of the adjacent outer shell resting on said lamella.

In another variation of the invention, the spacer element is an elastically deforming plastic ring.

A foremost advantage offered by the invention is the increase in the pipeline's buckling strength and hence the feasibility of making the shell(s) used thinner.

Another advantage of this design is that shear stresses are absorbed between the two shells when the insulating material is being compressed between the outer shell flutings and the inner shell.

The invention offers still another advantage in being devoid of accessory means when transmitting the axial stresses between the shells.

BRIEF DESCRIPTION OF THE DRAWINGS

Other features, advantages and particulars of the invention are elucidated in the following illustrative and supplementary description of the invention and in relation to the attached drawings.

FIG. 5a is a partial section of another embodiment of the pipeline, and FIG. 5b is a partial section of still another embodiment of the pipeline.

DESCRIPTION OF THE PREFERRED EMBODIMENTS

Figure 1:
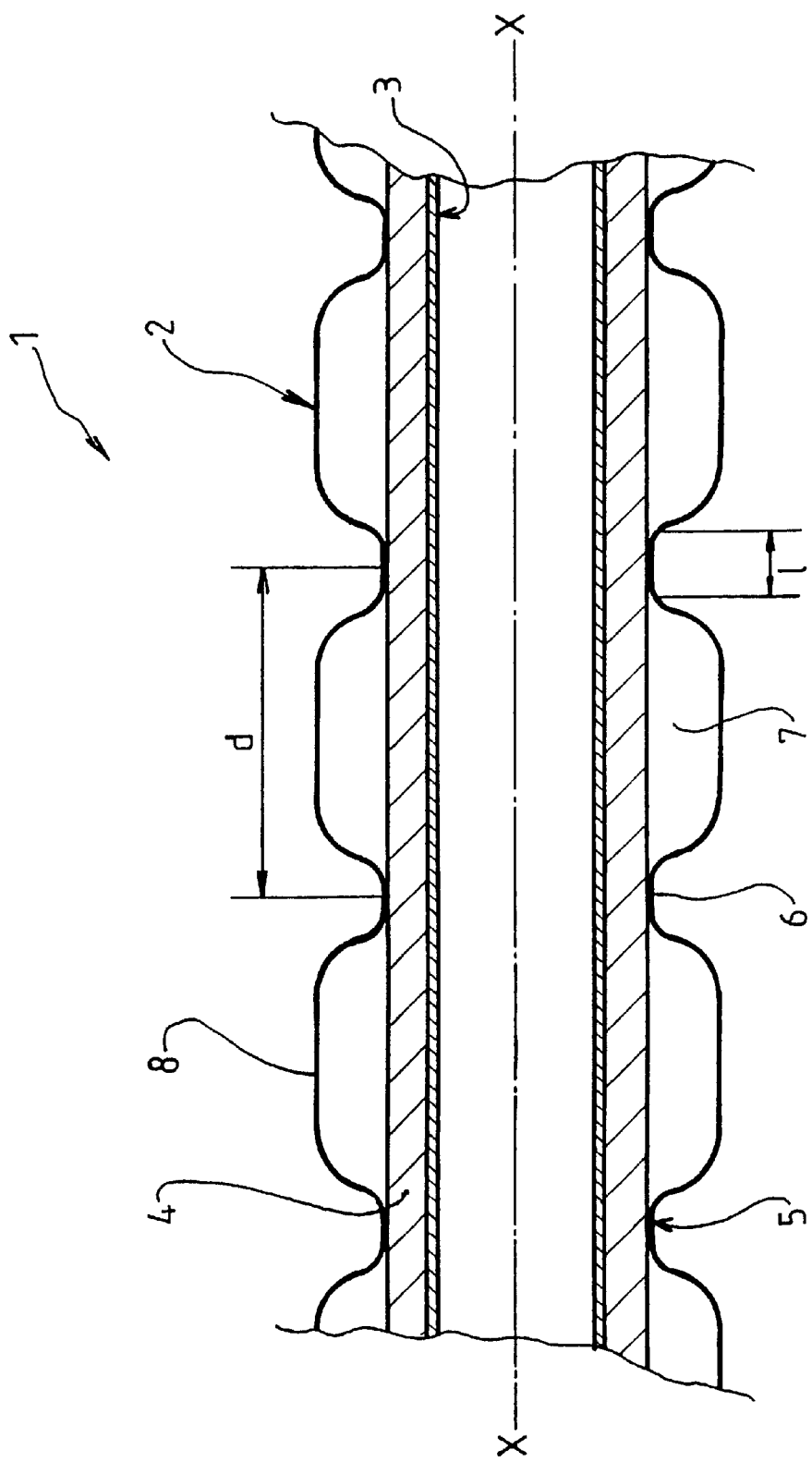
FIG. 1 is a lengthwise section of a double-shell pipeline with a spacer material between the shells.
Figure 6:
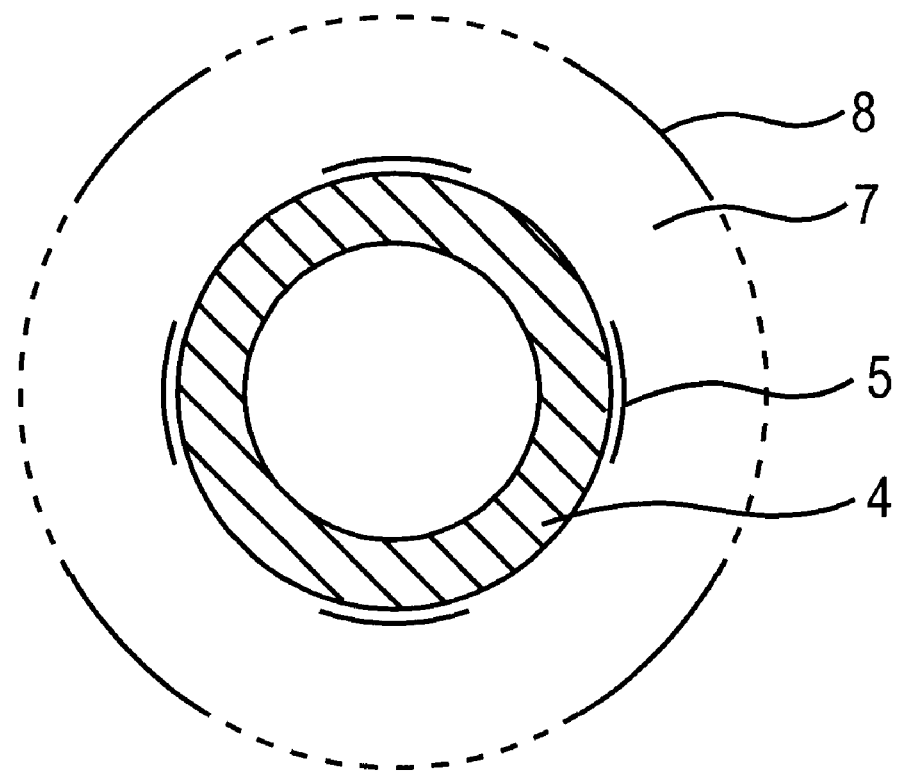
FIG. 6 is a radial cross-sectional view of the embodiment shown in FIG. 1.

In one embodiment of the invention which is shown in FIG. 1, the pipeline consists of two shells (or tubes) 2 and 3, where the inner shell 3 moves the effluent and shell 2 is the outer shell. These two shells are configured mutually concentrically and are apart by an annular space 7. In combination with an insulating layer 4, the annular space 7 allows thermally insulating the inner shell 3. FIG. 6 is a radial cross-sectional view of the arrangement shown in FIG. 1. This design is conventional and more details may be found in applicant's prior patent FR 2,746,891.

In the present invention, the outer shell 2 is annularly shaped from site to site by external compression to subtend flutings 5. Accordingly the fluting bases in this design make contact with the spacer element 4 which in this case is a thermal insulator. Therefore the outer shell 2 in this embodiment consists of alternating salients 8 and flutings 5 between said salients 8.

These flutings acts as bracing means (buckling arrestors) and allow transcending conventional engineering codes the expert must follow in designing a pipeline. As a result thinner shells may be used, with a saving in weight, while retaining sufficient mechanical strength.

In this manner the invention provides a sandwich structure wherein the outer shell is mechanically linked by the spacer element to the inner shell. Hydrostatic-pressure strength is assured in this design by the combination of the two shells, not by each shell separately.

Said flutings may be implemented in a number of ways. One particularly economical procedure consists for instance in using machinery described in applicant's patent FR 2,786,713 which includes a shaping shoe to shape the flutings and which shall be forced against the outer shell that as a result shall be shaped by compression. Said machinery of course offers the advantage of being used during pipeline assembly regardless of the particulars of this pipeline.

FIG. 1 shows that the bottom 6 of each fluting 5 makes contact with the spacer material 4. This design is especially advantageous when using a substantially crush-proof spacer material such as the ceramics-based, preferably silica-based, micro-pore thermal insulators such as are described in the above cited patent. It is understood that the thermal insulator may be slightly or substantially warped when implementing the flutings.

It is understood that the fluting geometries may vary. Illustratively the width w of as fluting 5 may be between 1 mm and 10 cm when the cross-section of the fluting is constant, and the distance d between two consecutive flutings may be approximately between one fourth the diameter of the fluted shell and triple this diameter.

In a particular illustrative embodiment, the pipeline 1 may consist of an inner shell 3 which is 12.7 mm thick and has an outside diameter of 273 mm and of an outer shell 2 which is 6.35 mm thick and has an outside diameter of 324 mm, thus bounding an annular space 7 which is 19 mm wide before fluting shaping takes place and wherein is mounted a micro-porous insulator illustratively 15 mm thick, allowing flutings 10 mm deep and 4 mm wide at their bottom and spaced by about 30 cm from each other. In this embodiment the bottoms 6 advantageously compress the insulating material. In such a design the two shells can form a sealed enclosure. Tests show that the outer shell 2 of such a pipeline withstands buckling pressures of about $13 \times 10^6$ Pa. The same shell but without flutings offers a buckling strength of about $40$–$50 \times 10^5$ Pa. As a consequence pipelines may be designed in the manner of the invention using wider tolerances for the shells. It is understood that the pipeline 1 may be used to move the effluents toward firm ground without structural modifications, not mandatorily at the seabed.

In the above embodiment, the flutings 5 were schematically indicated being substantially concentric and exhibiting a substantially regular cross-section along the XX axis of the pipeline. Obviously these flutings also may slope relative to the XX axis or run excentrically to it.

In a variation of the invention, the flutings 5 and/or the salients 8 may be regularly and/or irregularly spaced apart and at different depths.

Also, the flutings 5 were shown as being closed curves. But obviously they also may be implemented in the form of open curves, for instance a helix.

As regards a double-shell pipeline of which the inner shell is made of a costly material (such as Invar or titanium) the thickness of the two shells may be advantageously reduced by means of a matching set of flutings as described above.

Figure 2:
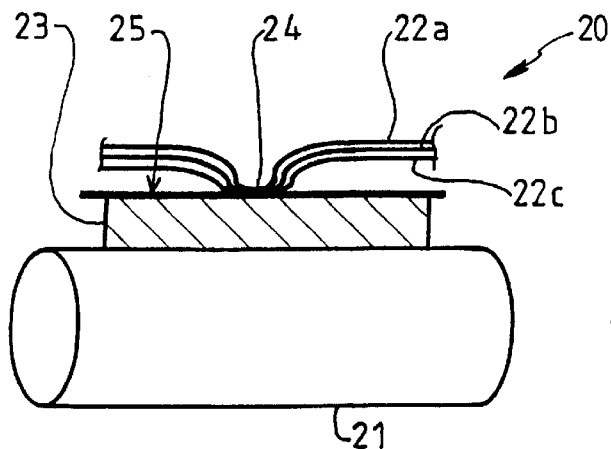
FIG. 2 is a partial section of an outer multi-shell pipeline.

FIG. 2 shows a pipeline 20 constituted by an inner shell 21 and a set of outer shells 22a, 22b, 22c. A spacer material 23 is mounted around the inner shell 21 and the flutings 24 (only one being shown) rest on this spacer element. In this embodiment the spacer element 23 is the same as used in FIG. 1.

Figure 3:
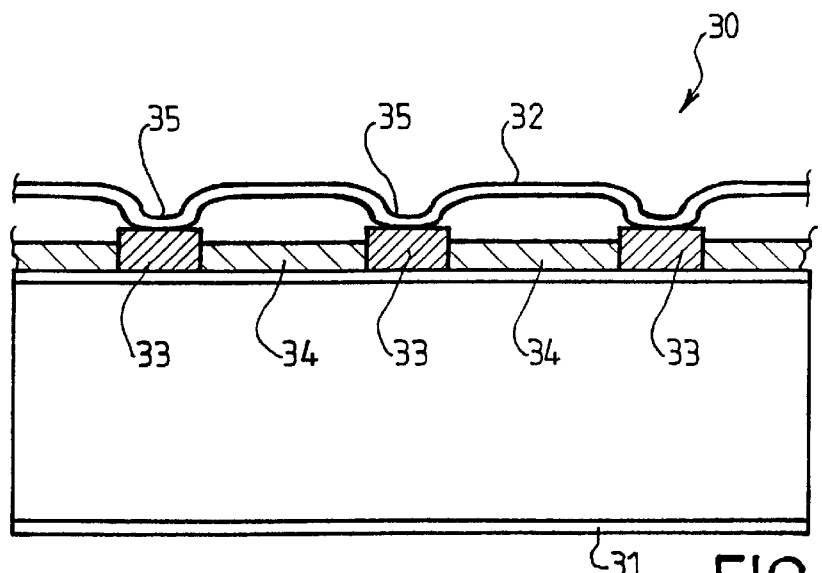
FIG. 3 is a partial section of a double-shell pipeline using another spacer material.

FIG. 3 shows a pipeline 3 constituted by an inner shell 31 and outer shell 32. The spacer material in this instance consists of a number of elastomeric rings 33 separating the insulating lamellas 34. This Figure shows that in this embodiment the flutings 35 rest on the rings 33 rather than on the insulator 34. The rings are lined up with the flutings and are made of an elastically deforming plastic while exhibiting good compression strength and sufficient shape memory to maintain a constant pressure on the flutings in spite of the elastic restoration intrinsic to the deformation of the outer shell(s). Illustratively the rings 33 are made of a rubber such as a monomeric diene ethylene polypropylene polymer, a polyurethane elastomer, polypropylene, teflon, nylon.

Figure 4:
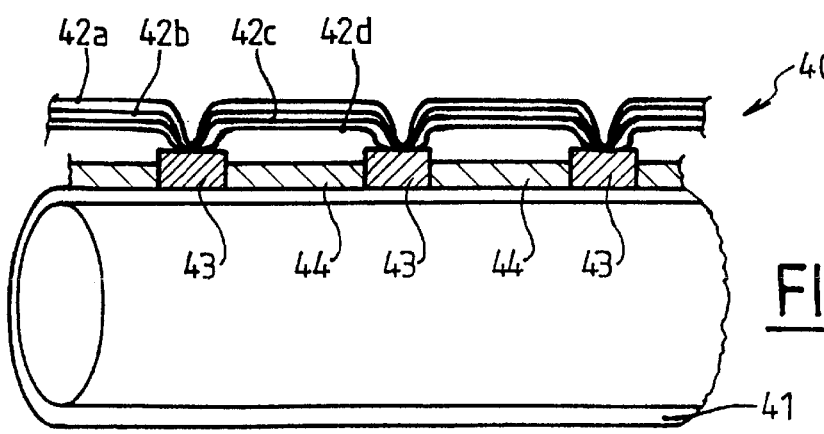
FIG. 4 is a partial section of a multi-shell pipeline fitted with another spacer material.

FIG. 4 shows a pipeline 40 consisting of an inner shell 41 and of a set of outer shells 42a, 42b, 42c, 42d. The spacer element in this embodiment is constituted by a given number of rings 43 separating the insulating lamellas 44. This Figure shows that the flutings 45 in this embodiment rest on the rings 43, not on the insulator. It is understood that when there are several outer shells, their individual thickness shall be made to match the particular design. The total thickness of the outer shells shall be roughly the same as the thickness of a single shell such as was described above in relation to FIGS. 1 and 3.

In the present invention, the shells are mechanically interlinked. Ordinarily the inner shell moving the fluid also contributes to mechanical strength to withstand hydrostatic pressure. Accordingly the combination of these shells is a factor in the set of pipeline characteristics. This novel design allows making pipelines of lesser weight by reducing the shells' thicknesses. The sandwich structure proposed for the first time in this field allows applying also for the first time the hydrostatic pressure to the assembly rather than to each shell. Accordingly the dimensions of each shell no longer need meet the total hydrostatic pressure.

The above described crimps of the outer shell(s) onto the spacer or thermally insulating material in turn are compressed onto the inner tube and allows transmitting the axial strain (tension) between the shells without resort to accessory means.

In FIG. 2, the thermal protection layer 23 is covered by a metallic lamella 25, for instance made of steel. A lamella about 0.1 to 1 mm thick is quite appropriate. In addition to protecting the layer 23, the metal lamella will perforce buckle locally when the outer shell(s) is (are) shaped, as a result of which a passageway is advantageously subtended to allow free passage to the gaseous fluid, air for instance, between two consecutive salients and hence between the two pipeline ends. This free passageway might be held at a partial vacuum to increase the effectiveness of the thermal insulator. Be it borne in mind that said passageway also shall be present when the flutings are directly applied against the thermal insulator(s) or the spacers on account of the imperfections of the inside surface of the outer shell.

FIG. 5a shows an embodiment variation of the pipeline 50 of the invention whereby each of the three outer shells is shaped in alternating manner: the inner shell 51 is fitted with thermally insulating layers 53 separated by spacers 54. In this embodiment mode, the first outer shell 52a is fitted with flutings 55 resting on the thermal insulator, the second outer shell 52b is fitted with flutings 56 resting on the salients of the first outer shell 52a, and the third outer shell 52c is fitted with flutings 57 resting on the salients of the second shell 52b.

In another variation, the flutings of the third outer envelope 52c may be combined with those of the second outer shell.

FIG. 5b shows a pipeline 50' comprising an inner shell 51' and two outer shells 52a' and 52b'. In this embodiment mode, the flutings of the first outer shell 52a' rest on the spacers 54'—not on the thermally insulating layers 53'. The flutings of the second shell 52b' then rest on the salients of the first outer shell 52a' and so forth.

What is claimed is:

1. A pipeline for moving effluents at seabed level, comprising an inner shell and at least one outer shell having an outside diameter and an outer surface separated from the inner shell by an annular space for receiving an insulating layer, wherein the outer shell comprises a set of mutually spaced flutings arrayed along at least a portion of the outer surface and each fluting has a bottom resting on a spacer element located around the inner shell.

2. The pipeline according to claim 1, wherein the flutings are arrayed over the full length of the outer shell.

3. The pipeline according to claim 2, wherein the flutings have a depth between 1 and 10% of the outside diameter of the outer shell.

4. The pipeline according to claim 2, wherein the flutings comprise an inside base having a width (w) which is approximately between 1 mm and 30% of the outside diameter of the outer shell.

5. The pipeline according to claim 1, wherein the flutings are substantially concentric with a longitudinal axis of the pipe.

6. The pipeline according to claim 5, wherein the flutings are substantially circular in cross section.

7. The pipeline according to claim 1, wherein the flutings are spaced mutually apart by a distance substantially 0.25 to 3 times the outside diameter of the outer shell.

8. The pipeline according to claim 1, wherein the flutings comprise a helix having a pitch substantially 0.25 to 3 times the outside diameter of the outer shell.

9. The pipeline according to claim 1, wherein the spacer element is an insulator.

10. The pipeline according to claim 9, wherein the insulating layer is an open-pore micro-pore material.

11. The pipeline according to claim 1, further comprising a metal lamella located against the insulating layer, the flutings of the outer shell resting on said lamella.

12. The pipeline according to claim 1, wherein the spacer element comprises an elastically deformable ring made of a material selected from a group consisting of polyurethane elastomer, polypropylene, teflon, nylon and rubber.

* * * * *